(12) United States Patent
Fang et al.

(10) Patent No.: US 7,845,840 B2
(45) Date of Patent: Dec. 7, 2010

(54) LIGHT GUIDE PLATE AND BACKLIGHT MODULE HAVING THE SAME

(75) Inventors: Chong-Yang Fang, Tainan County (TW); Yu Chen Ting, Changhua County (TW); Chih Ming Chen, Taichung County (TW)

(73) Assignee: Wintek Corporation, Taichung (TW)

( * ) Notice: Subject to any disclaimer, the term of this patent is extended or adjusted under 35 U.S.C. 154(b) by 216 days.

(21) Appl. No.: 12/153,156

(22) Filed: May 14, 2008

(65) Prior Publication Data
US 2008/0285309 A1 Nov. 20, 2008

(30) Foreign Application Priority Data
May 17, 2007 (TW) .............................. 96117518 A

(51) Int. Cl.
*F21V 7/04* (2006.01)
(52) U.S. Cl. .................. 362/620; 362/619; 362/626
(58) Field of Classification Search .............. 362/608, 362/615, 619, 620, 625, 626
See application file for complete search history.

(56) References Cited

U.S. PATENT DOCUMENTS

| 5,711,589 A | 1/1998 | Oe et al. |
| 6,700,634 B2 | 3/2004 | Taniguchi et al. |
| 7,011,442 B2 | 3/2006 | Okuwaki et al. |
| 7,370,999 B2 * | 5/2008 | Feng et al. .................. 362/619 |
| 2006/0164863 A1 | 7/2006 | Chang et al. |

FOREIGN PATENT DOCUMENTS

JP  2006261064  9/2006

* cited by examiner

*Primary Examiner*—John A Ward
(74) *Attorney, Agent, or Firm*—Muncy, Geissler, Olds & Lowe, PLLC

(57) ABSTRACT

A light guide plate has a light-receiving surface, a light-emitting surface, and a light-reflecting surface. Multiple first arc-shaped longitudinal structures are arranged on the light-receiving surface with their longitudinal directions being substantially parallel with each other. Multiple second arc-shaped longitudinal structures are arranged on the light-emitting surface with their longitudinal directions being substantially parallel with each other. The light-reflecting surface is shaped to form a plurality of prismatic structures, and a luminance-adjusting structure is formed on part of the light-reflecting surface near the point light source and interlaced with the prismatic structures.

22 Claims, 12 Drawing Sheets

LIGHT GUIDE PLATE AND BACKLIGHT MODULE HAVING THE SAME

CROSS REFERENCE TO RELATED APPLICATION

This application claims priority of application No. 096117518 filed in Taiwan R.O.C on May 17, 2007 under 35 U.S.C. 119; the entire contents of which are hereby incorporated by reference.

BACKGROUND OF THE INVENTION

1. Field of the Invention

The invention relates a light guide plate and a backlight module having improved luminance uniformity.

2. Description of the Related Art

Typically, a linear light source such as a cold-cathode fluorescent lamp (CCFL) is often used in a backlight module; however, it is bulky and thus not suitable for a compact electronic product such as a handheld display. In contrast, a point light source such as a light-emitting diode (LED) is fit for such kind of electronic product due to its small size.

FIG. 1 shows a schematic diagram illustrating a conventional backlight module using a point light source. Referring to FIG. 1, point light sources 104 such as light emitting diodes are positioned next to one side surface 102a of a light guide plate 10, and the top surface 102b and the bottom surface 102c of the light guide plate 10 which are opposite to each other are both provided with prismatic structures formed by V-shaped grooves 106.

As to a point light source, the relationship between the radiant power and the angle between the observer's line of sight and the surface normal is governed by the Lambert's emission law. Hence, in case a point light source 104 is used as a side light source of a backlight module and the propagation direction of its emitting light is directed toward the normal of the light-emitting surface 102b with the aid of a prism sheet (not shown), multiple bright stripes 110 having comparatively high brightness often emerge on the light guide plate 10 at locations near the side surface 102a to cause inferior luminance uniformity, as shown in FIG. 2.

BRIEF SUMMARY OF THE INVENTION

An object of the invention is to provide a light guide plate and a backlight module having improved luminance uniformity.

According to an embodiment of the invention, a light guide plate used for receiving and spreading out the emitting light of at least one point light source has a light-receiving surface, a light-emitting surface, and a light-reflecting surface. The light-receiving surface is next to the point light source for receiving the emitting light of the point light source, and a plurality of first arc-shaped longitudinal structures are arranged on the light-receiving surface with their longitudinal directions being substantially parallel with each other. The light-emitting surface through which the light propagating in the light guide plate exits is formed at an angle with the light-receiving surface, and a plurality of second arc-shaped longitudinal structures are arranged on the light-emitting surface with their longitudinal directions being substantially parallel with each other. The light-reflecting surface is opposite to the light-emitting surface for guiding the light passing through the light-receiving surface to the light-emitting surface, and the light-reflecting surface is shaped to form a plurality of prismatic structures. A luminance-adjusting structure is formed on part of the light-reflecting surface near the point light source and interlaced with the prismatic structures.

According to another embodiment of the invention, a backlight module includes a plurality of point light sources, a light guide plate, and at least one prism sheet placed between the light guide plate and a display panel. The light guide plate is provided with at least one first light-diffusing structure arranged near the point light sources for varying the propagation paths of their emitting light and at least one second light-diffusing structure distributed on an entire surface of the light guide plate for uniformly diffusing the light transmitted into the light guide plate. The point light sources are placed at intervals and next to the light guide plate, and the first light-diffusing structure spreads on individual local regions of the bottom surface of the light guide plate, with each local region having a width no more than the distance between two adjacent point light sources and a length no more than one-third the total length of the light guide plate.

According to the above embodiments, the emitting light rays of the point light sources are first dispersed when they strike the first arc-shaped longitudinal structures on the light-receiving surface. Then, after the light rays propagating in the light guide plate are directed toward the light-emitting surface, the second arc-shaped longitudinal structures on the light-emitting surface further diffuse the light rays to allow for a more uniform surface emission. Hence, the luminance uniformity of the light guide plate is considerably improved and the undesirable bright stripes are eliminated as well. Besides, the luminance-adjusting structure is placed on individual local regions to diffuse the light rays. Hence, the propagation paths of light rays that strike the luminance-adjusting structure are varied to further ensure the luminance uniformity and effectively eliminate the bright stripes without lowering the luminance of the front end of the light guide plate.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," and variations thereof herein are used broadly and encompass direct and indirect connections, couplings, and mountings. Similarly, "adjacent to" and variations thereof herein are used broadly and encompass directly and indirectly "adjacent to". Therefore, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 3:
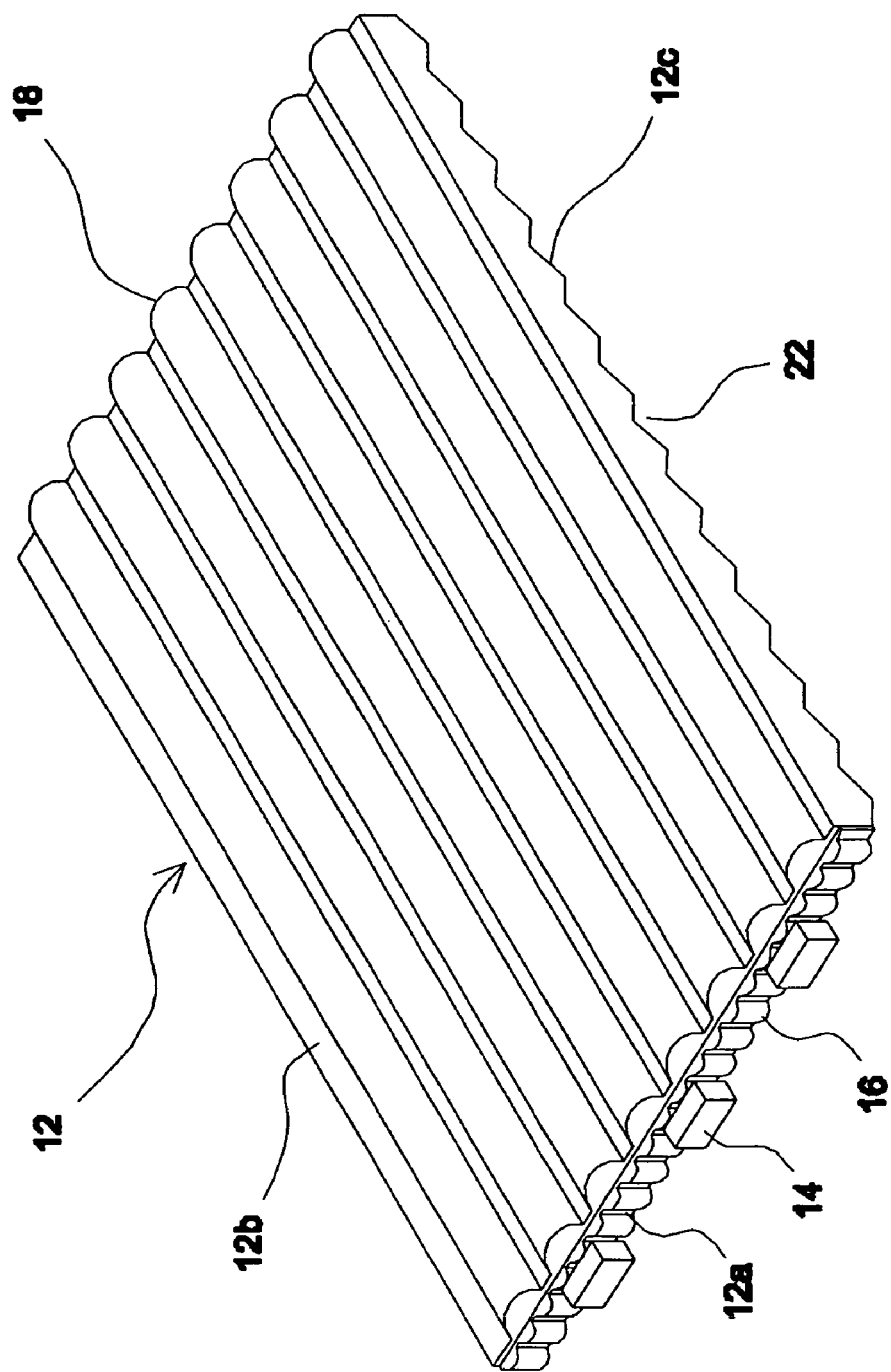
FIG. 3 shows a schematic diagram illustrating a light guide plate according to an embodiment of the invention.

FIG. 3 shows a schematic diagram illustrating a light guide plate according to an embodiment of the invention. The light guide plate is used to receive and then evenly spread out the emitting light of at least one point light source to provide surface emission. Referring to FIG. 3, one side surface of the light guide plate 12 next to three light emitting diodes (LEDs) 14 functions as a light-receiving surface 12a, and the top surface of the light guide plate 12 formed at an angle with the light-receiving surface 12a functions as a light-emitting surface 12b. Also, the bottom surface of the light guide plate 12 opposite to the light-emitting surface 12b functions as a light-reflecting surface 12c. The emitting light of the light emitting diodes 14 passes through the light-receiving surface 12a and then is confined in the light guide plate 12, and the internally propagating light rays are reflected by the light-reflecting surface 12c to leave the light guide plate 12 by the light-emitting surface 12b.

According to this embodiment, a plurality of arc-shaped longitudinal structures 16 are arranged in succession on the entire area of the light-receiving surface 12a, with their longitudinal directions being parallel with each other. Herein, the term "arc-shaped longitudinal structure" is defined as a longitudinal structure having a cross-section with at least one curved side, such as a segment or a sector of a circle in cross-section. Also, a plurality of arc-shaped longitudinal structures 18 are arranged in succession on the entire area of the light-emitting surface 12b, with their longitudinal directions being parallel with each other and parallel with the normal of the light-receiving surface 12a. Further, the longitudinal directions of the arc-shaped longitudinal structures 18 on the light-emitting surface 12b are perpendicular to the longitudinal directions of the arc-shaped longitudinal structures 16 on the light-receiving surface 12a. Besides, the light guide plate 12 are cut to form multiple V-shaped grooves 22 that function as prismatic structures on its light-reflecting surface 12c, and the longitudinal directions of the V-shaped grooves 22 are parallel with each other and perpendicular to the longitudinal directions of the arc-shaped longitudinal structures 18.

According to the above design, the emitting light rays of the light-emitting diodes 14 are first dispersed when they strike the arc-shaped longitudinal structures 16 on the light-receiving surface 12a. Then, after the light rays propagating in the light guide plate 12 are reflected or refracted by the V-shape grooves 22 and then directed toward the light-emitting surface 12b, the longitudinal structures 18 on the light-emitting surface 12b further diffuse the light rays to allow for a more uniform surface emission. Hence, the luminance uniformity of the light guide plate 12 is considerably improved and the undesirable bright stripes are eliminated as well.

Figure 4A:
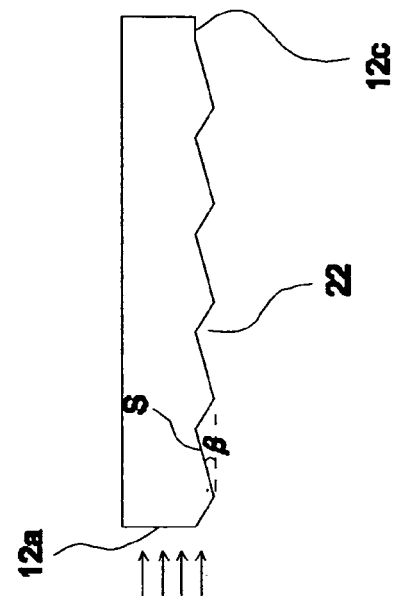
FIGS. 4A and 4B are schematic diagrams illustrating the arc angle design of the arc-shaped longitudinal structures.
Figure 4B:
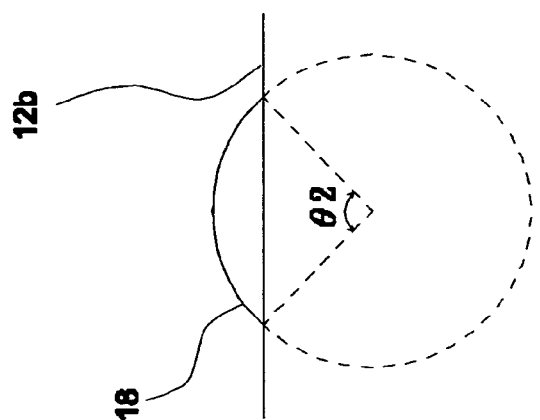

FIGS. 4A and 4B are schematic diagrams illustrating the arc angle design of the arc-shaped longitudinal structures. Referring to FIG. 4A, the arc angle θ1 of the arc-shaped longitudinal structures 16 relative to the light receiving surface 12a is preferably in the range of 39 to 140 degrees to achieve better light scattering effect. Further, as shown in FIG. 4B, the arc angle θ2 of the arc-shaped longitudinal structures 18 relative to the light-emitting surface 12b is preferably in the range of 62 to 164 degrees to achieve better light scattering effect.

Figure 4C:
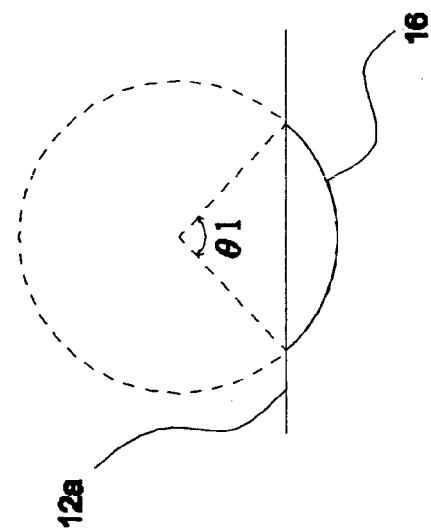
FIG. 4C shows a schematic diagram illustrating the inclination angle design of V-shaped grooves.

FIG. 4C shows a schematic diagram illustrating the inclination angle design of V-shaped grooves. Referring to FIG. 4C, the inclination angle β of each V-shaped groove 22 is preferably in the range of 1 to 7 degrees, where the inclination angle β is defined as the included angle between the inclined surface S facing the light-emitting diodes 14 and the normal of the light-receiving surface 12a.

Figure 5:
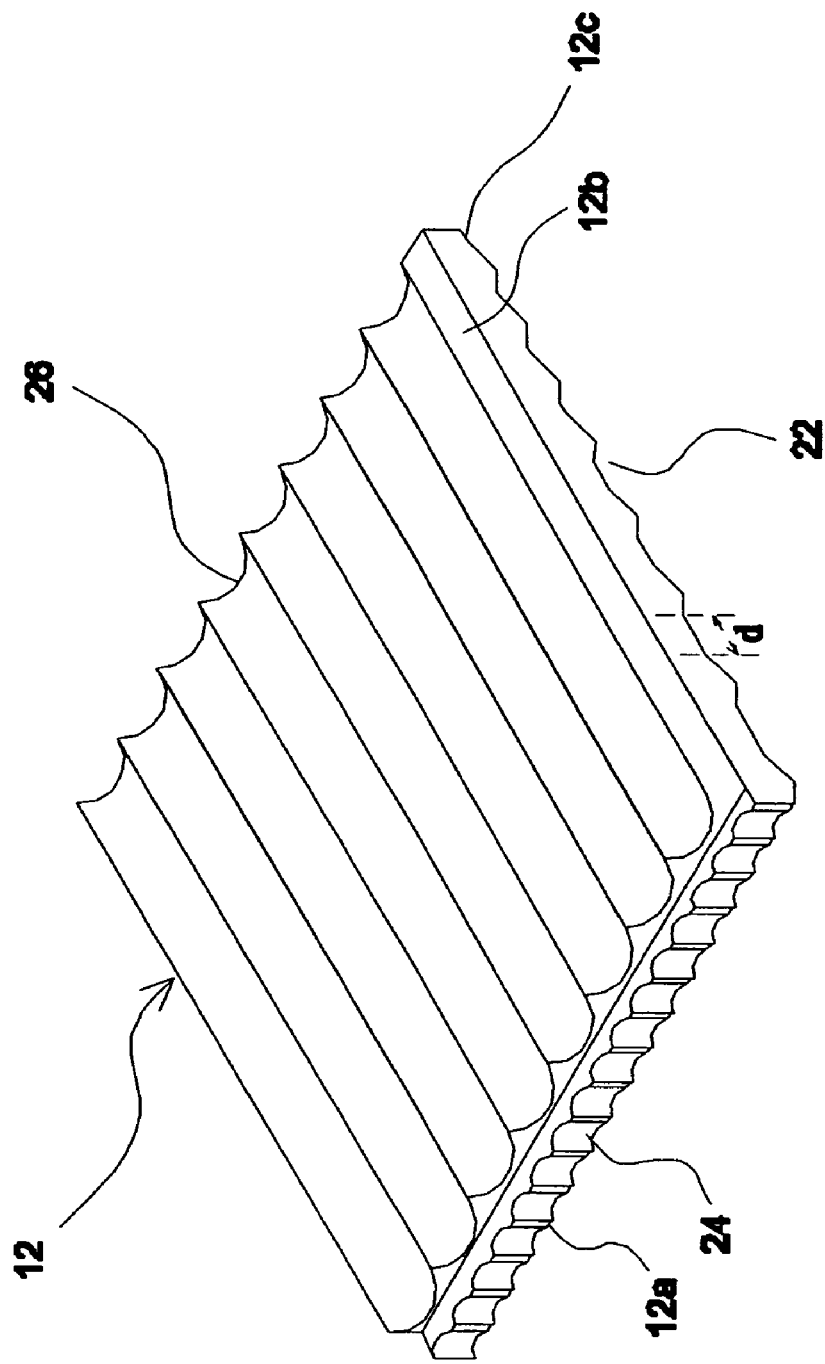
FIG. 5 shows a schematic diagram illustrating a light guide plate according to another embodiment of the invention.

Though the arc-shaped longitudinal structures shown in the above embodiments are bump structures stick out beyond the surface plane, this is not limited. In an alternate embodiment, the arc-shaped longitudinal structures 16 are arc-shaped slots 24 cut on the light-receiving surface 12a, and the arc-shaped longitudinal structures 18 are arc-shaped slots 26 cut on the light-emitting surface 12b, as shown in FIG. 5. Alternatively, arc-shaped bumps and arc-shaped slots may be both provided on the same surface plane to achieve the same light scattering effect. Further, the arrangement of the arc-shaped longitudinal structures on the surface is not limited to a specific manner. For example, the arc-shaped longitudinal structures 18 may be discretely provided with a gap formed between two adjacent longitudinal structures 18, as shown in FIG. 3. Alternatively, as shown in FIG. 5, the arc-shaped longitudinal structures (arc-shaped slots 26) may be continuously provided where each two arc-shaped slots 26 are next to each other. Besides, referring to FIG. 5, the distribution density of the V-shape grooves 22 on the light-reflecting surface 12c increases along with the increase of the distance away from the light-receiving surface 12a to further improve luminance uniformity. Similarly, the V-shape grooves 22 may be discretely provided as shown in FIG. 5, where an interval d between two adjacent V-shape grooves 22 decreases along with the increase of the distance away from the light-receiving surface 12a, or the V-shape grooves 22 may be continuously provided as shown in FIG. 3 where each two V-shape grooves 22 are next to each other.

Next, a luminance-adjusting structure formed on part area of the light guide plate is described below.

Figure 1:
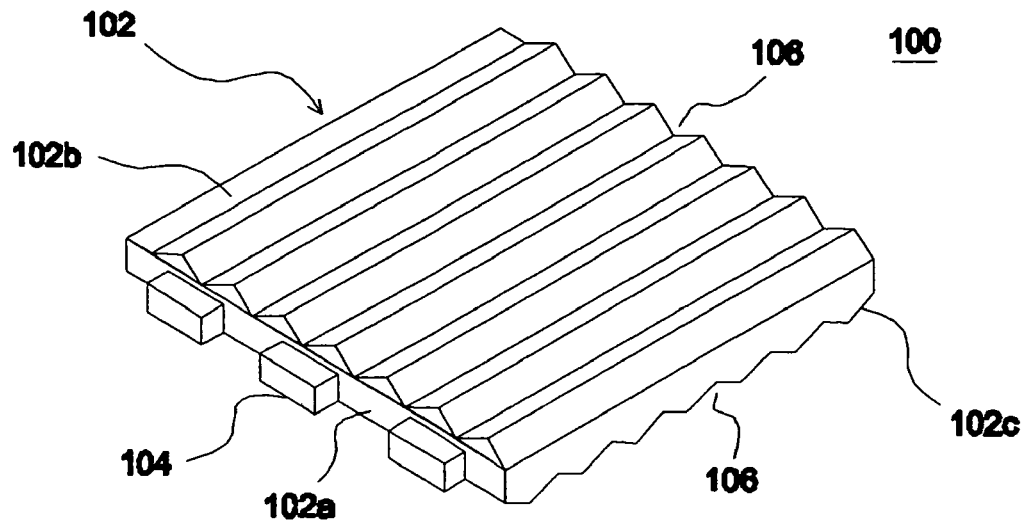
FIG. 1 shows a schematic diagram illustrating a conventional backlight module using a point light source.
Figure 2:
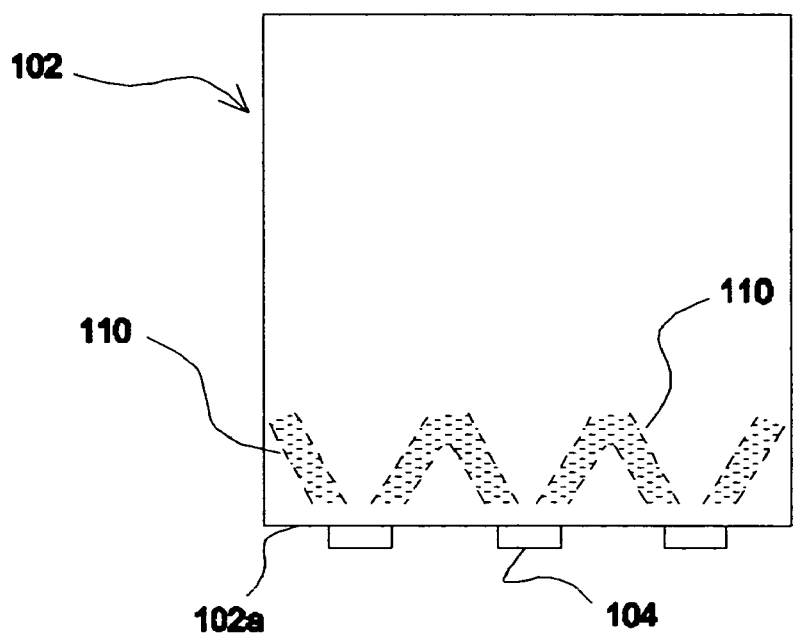
FIG. 2 shows a schematic diagram illustrating the appearance of undesirable bright stripes on a light guide plate.
Figure 6:
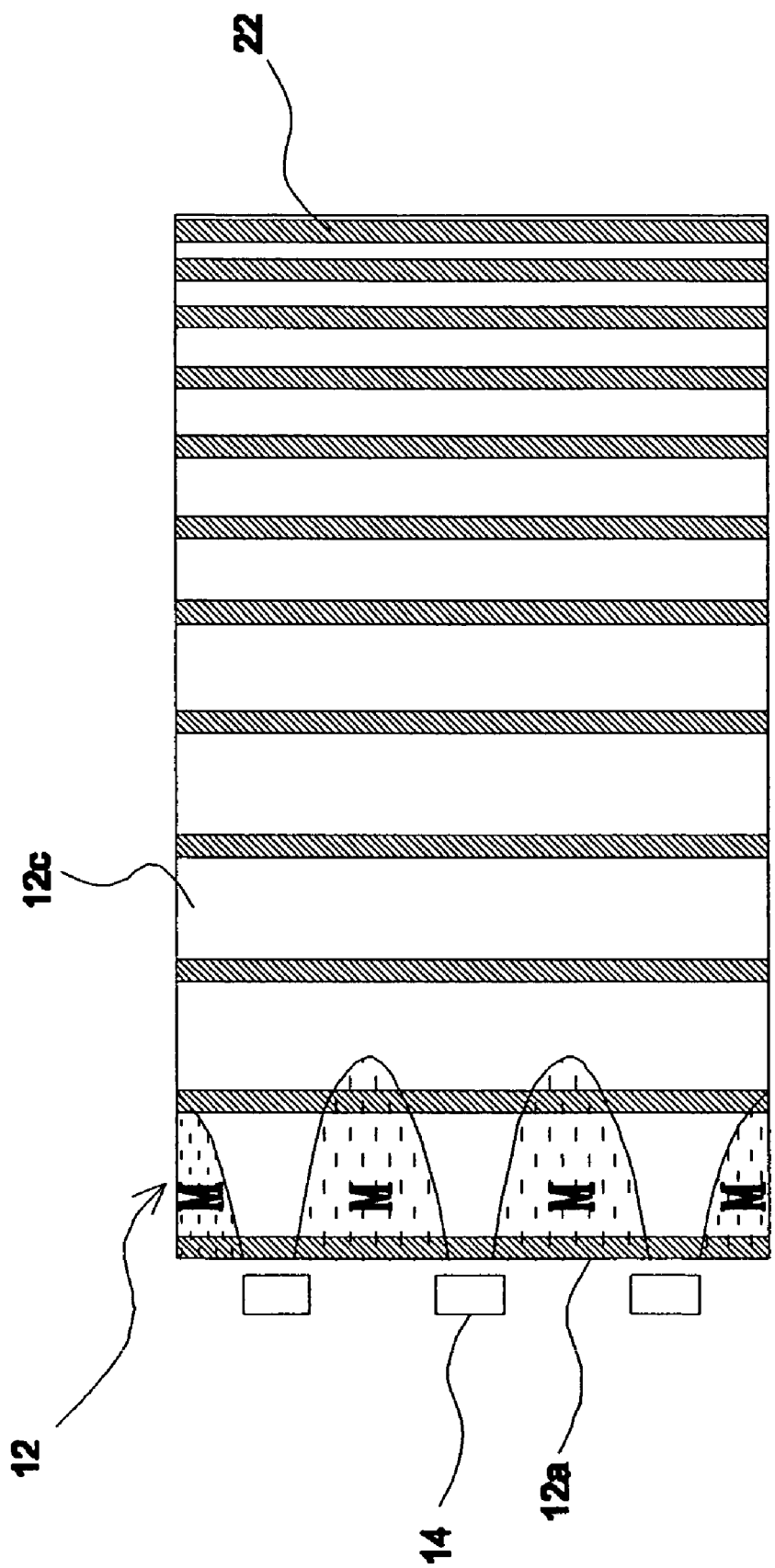
FIG. 6 shows a schematic diagram illustrating individual local regions of the bottom surface of the light guide plate which overlap the distribution pattern of undesirable bright stripes.

The luminance-adjusting structure capable of diffusing incoming light rays is provided on specific regions of the bottom surface of the light guide plate 12 which overlap the distribution pattern of undesirable bright stripes shown in FIG. 2. More specifically, referring to FIG. 6, several separate local regions M of the light-reflecting surface 12c, each of which is situated between two light-emitting diodes 14 and adjoins the light-receiving surface 12a, are marked out to indicate the approximate distribution of the undesirable bright stripes. The luminance-adjusting structure with adjustable dimension and distribution density is placed on each local region M to diffuse the light rays propagating in the region M. Hence, the propagation paths of light rays that strike the luminance-adjusting structure are varied to further ensure the luminance uniformity and effectively eliminate the bright stripes without lowering the luminance of the front end of the light guide plate 12.

Note that the locally distributed luminance-adjusting structure is formed on the light-reflecting surface 12c of the light guide plate 12 and interlaced with the V-shaped grooves 22 formed on the same surface. Further, when the point light sources 14 are placed at intervals and next to the light guide plate 12, the width of each local region M on which a luminance-adjusting structure spread is preferably not larger than the distance between two point light sources, and its length in the normal direction of the light-receiving surface 12a is preferably not larger than one-third the total length of the light guide plate 12.

Figure 7:
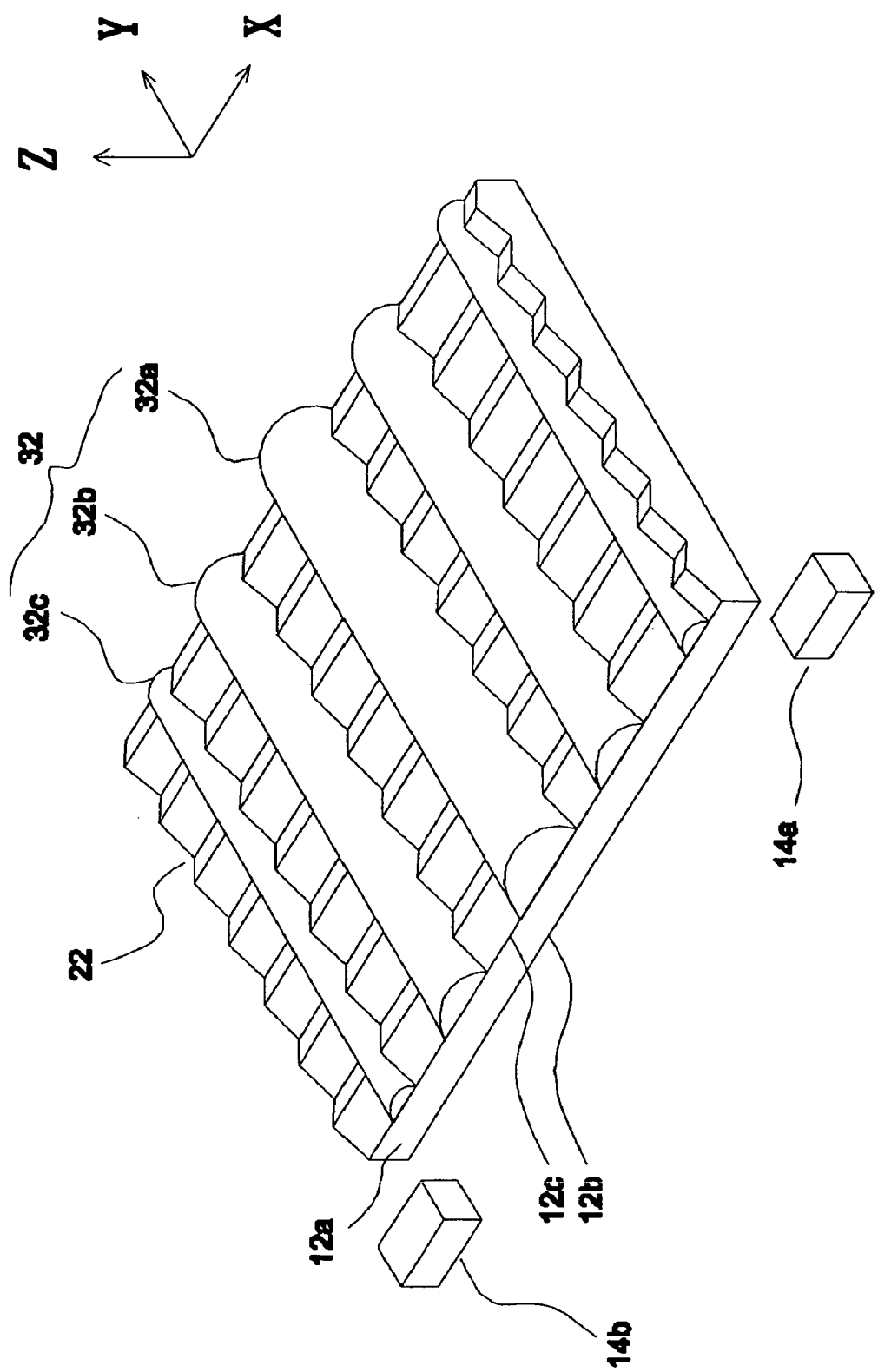
FIG. 7 shows a schematic diagram of a luminance-adjusting structure according to an embodiment of the invention.

FIG. 7 shows a schematic diagram of a luminance-adjusting structure according to an embodiment of the invention. Referring to FIG. 7, the light diffusion effect of the luminance-adjusting structure is varied according to the structure thickness (depth in the Z-direction), the length in the longitudinal direction (length in the Y-direction), and the distribution density. Note that the luminance-adjusting structure depicted in FIG. 7 is spread on one local region M that has a width equal to the distance between two light-emitting diodes 14a and 14b and a length no more than one-third the total length of the light guide plate 12. As shown in FIG. 7, according to this embodiment, the luminance-adjusting structure is constructed by multiple arc-shaped longitudinal elements 32 that are arranged on bottom side of the light guide plate 12 and perpendicularly interlaced with the V-shape grooves 22, with their longitudinal directions are parallel with the longitudinal directions of the arc-shaped longitudinal structures 18 on the light-emitting surface 12b. Further, in this embodiment, the distribution of thickness in longitudinal direction (Y-direction) of each longitudinal element is the same. Also, the distribution density of the arc-shaped longitudinal elements 32 increases along with the increase of the distance away from the light-emitting diode 14a or 14b; in other words, an arc-shaped longitudinal element 32 near the light-emitting diode 14a or 14b has a smaller size compared with that of another arc-shaped longitudinal element 32 far from the light-emitting diode 14a or 14b (32c<32b<32a).

Figure 8:
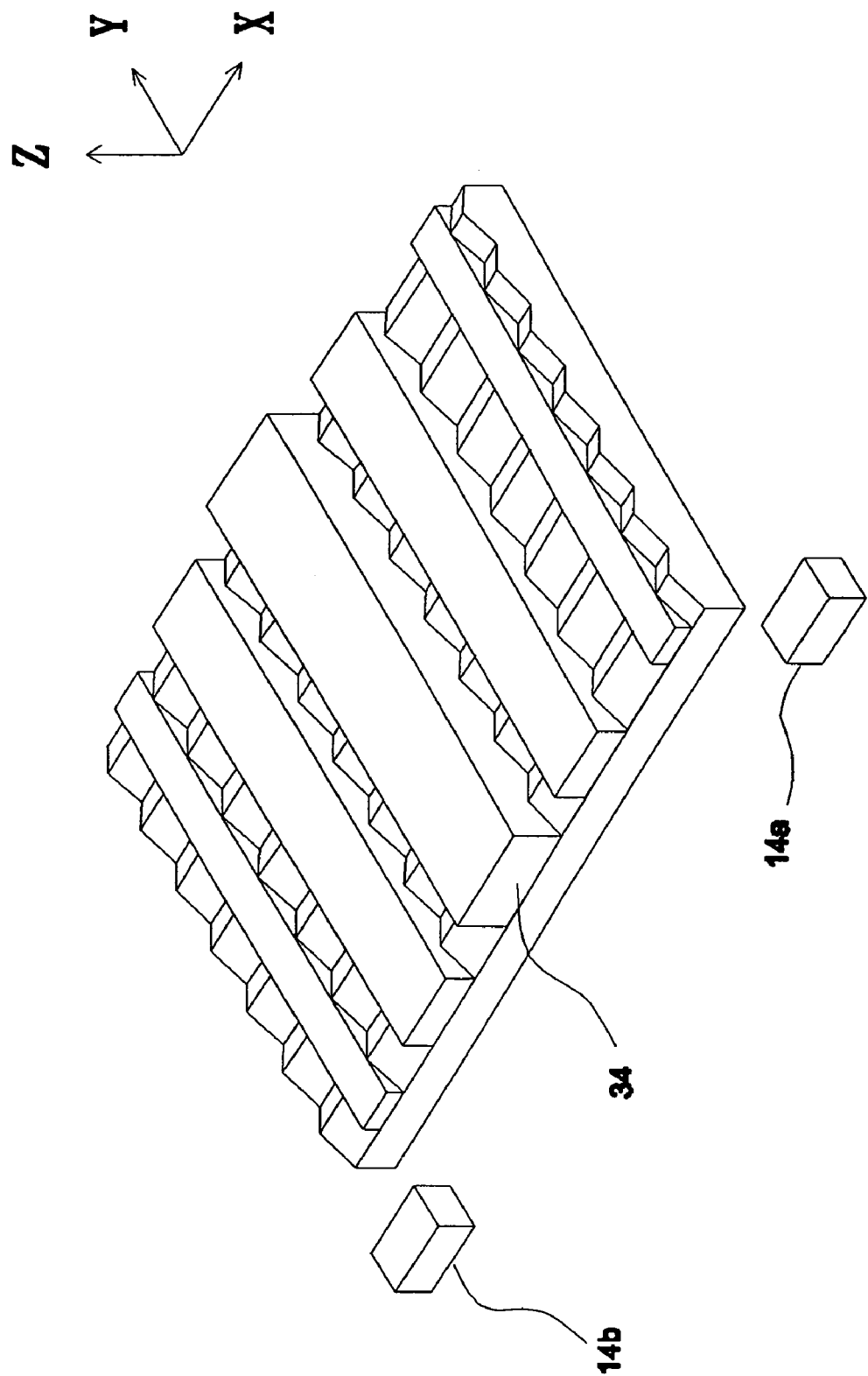
FIG. 8 shows a schematic diagram of a luminance-adjusting structure according to another embodiment of the invention.

Besides, the shape of the luminance-adjusting structure can be arbitrary selected, as long as it may achieve the effect of varying the propagation paths of incoming light rays. For example, the luminance-adjusting structure may be a rectangular-shaped longitudinal element 34 shown in FIG. 8, or a triangular-shaped longitudinal element 36 shown in FIG. 9. More broadly, it can be clearly seen the longitudinal element may have a shape of a sector of a circle, a segment of a circle, a quadrangle, or a triangle in cross-section.

Figure 9:
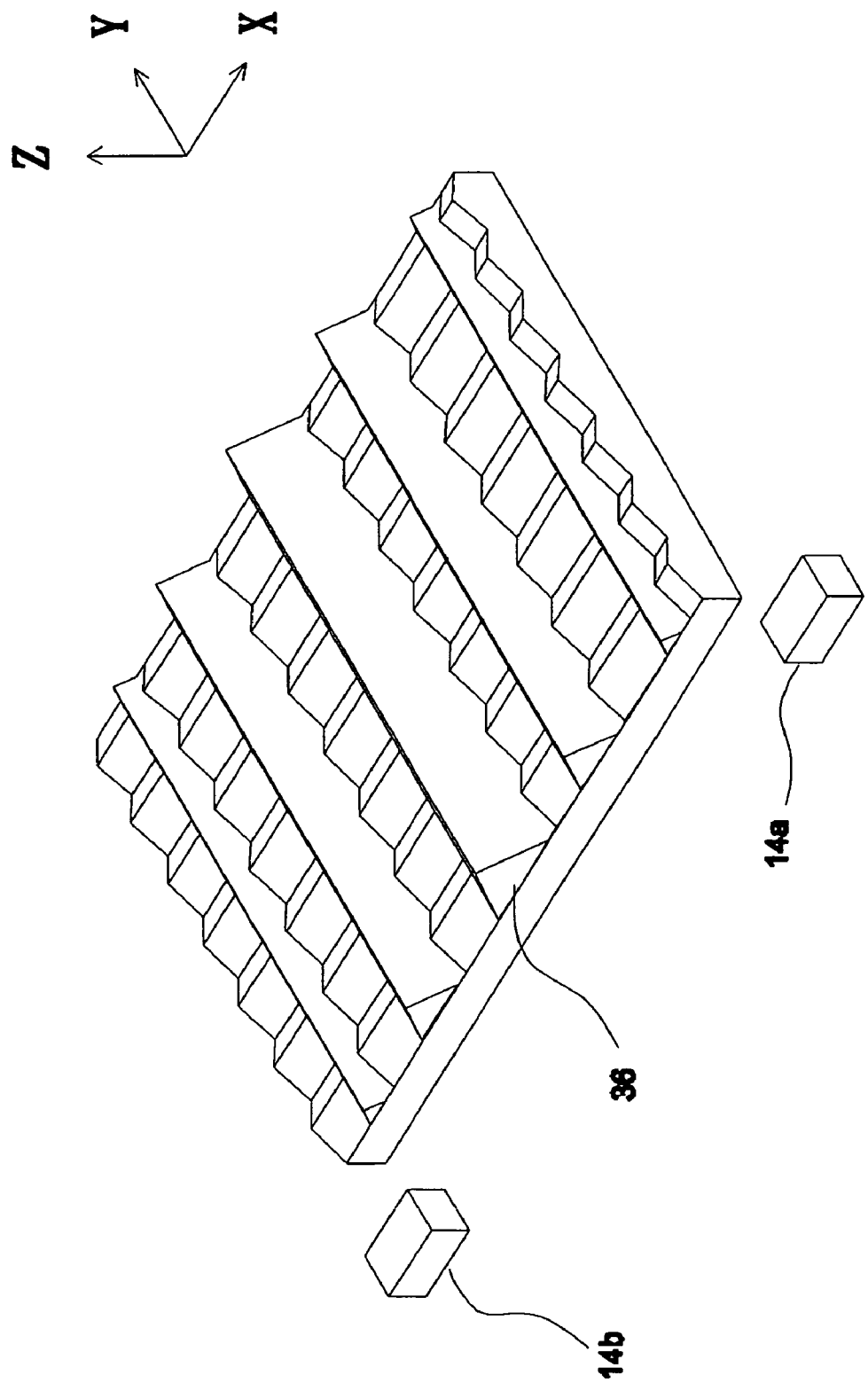
FIG. 9 shows a schematic diagram of a luminance-adjusting structure according to another embodiment of the invention.
Figure 10:
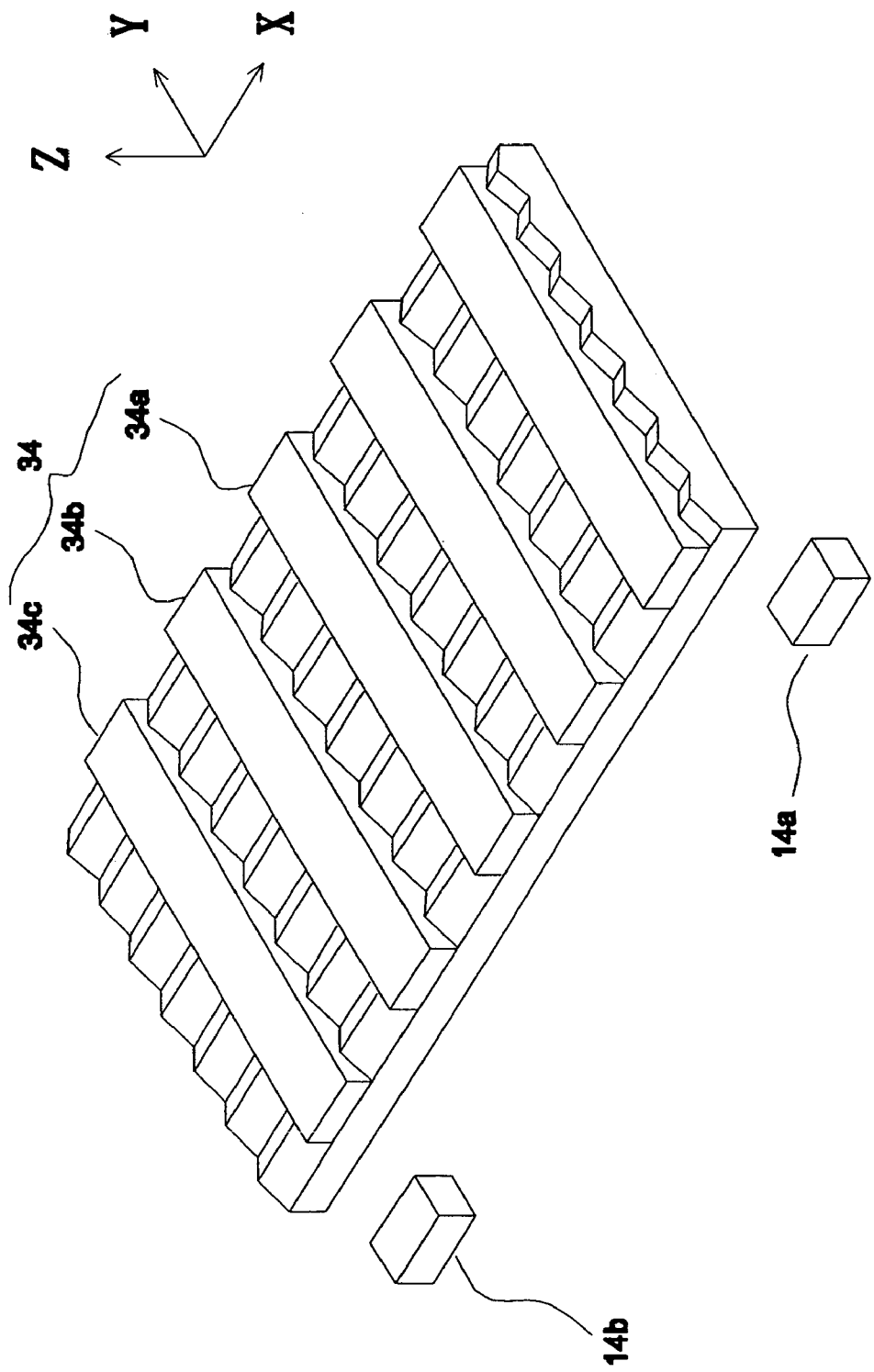
FIG. 10 shows a schematic diagram of a luminance-adjusting structure according to another embodiment of the invention.

FIG. 10 shows a schematic diagram of a luminance-adjusting structure according to another embodiment of the invention. Referring to FIG. 10, the distribution of thickness in longitudinal direction (Y-direction) of each rectangular-shaped longitudinal element is the same. Also, the distribution density of the rectangular-shaped longitudinal elements 34 is fixed instead of varying with the distance away from the light-emitting diode 14a or 14b; in other words, a rectangular-shaped longitudinal element 34 near the light-emitting diode 14a or 14b has the same size compared with that of another rectangular-shaped longitudinal element 34 far from the light-emitting diode 14a or 14b (32c=32b=32a). Note that the rectangular shape of the longitudinal elements shown in FIG. 10 is merely an example and does not restrict the scope of the invention. The arc shape shown in FIG. 7 or the triangular shape shown in FIG. 9 is also suitable for the arrangement of longitudinal elements shown in FIG. 10.

Figure 11:
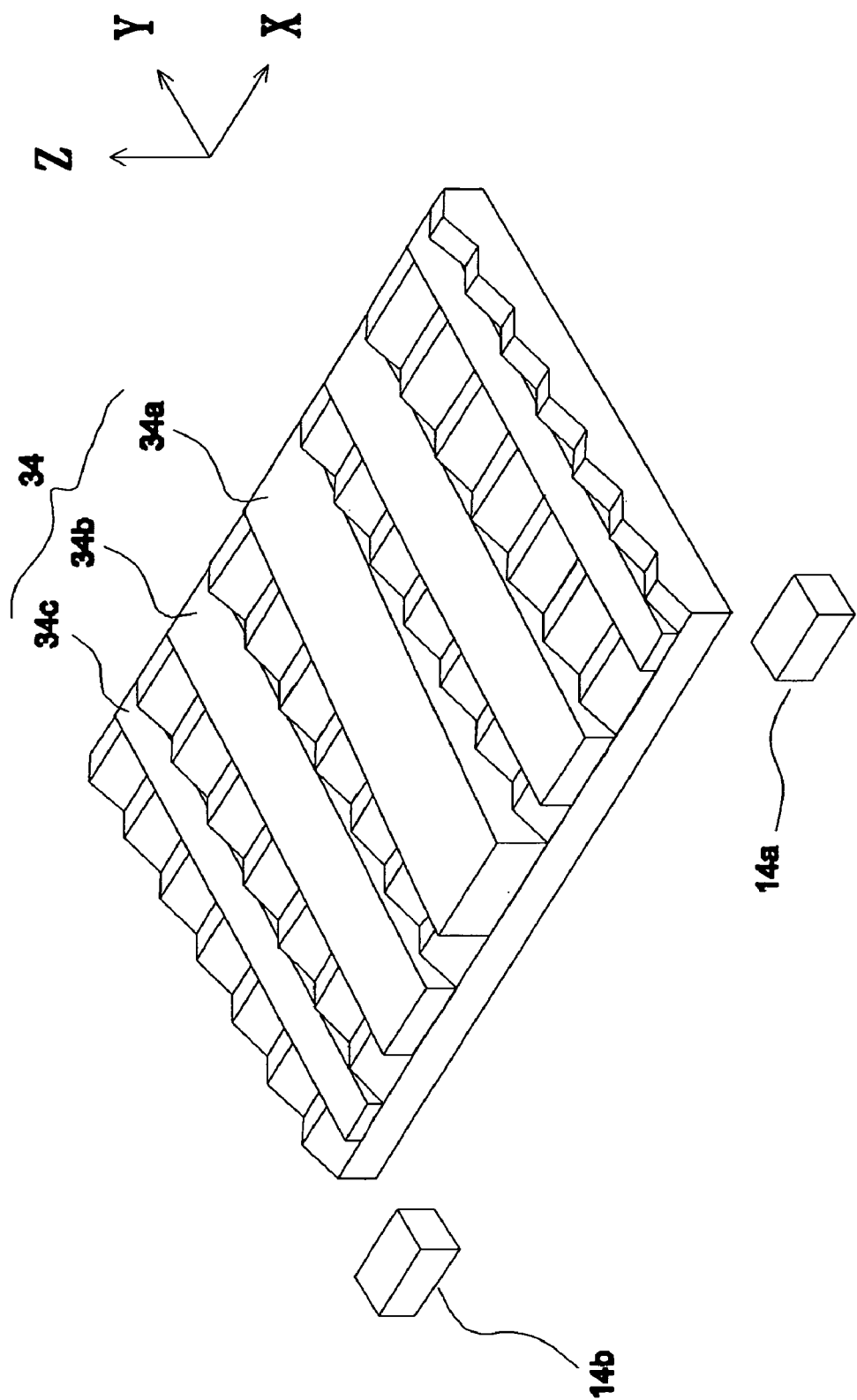
FIG. 11 shows a schematic diagram of a luminance-adjusting structure according to another embodiment of the invention.

FIG. 11 shows a schematic diagram of a luminance-adjusting structure according to another embodiment of the invention. Referring to FIG. 11, the thickness in longitudinal direction (Y-direction) of each rectangular-shaped longitudinal element 34 decreases along with the increase of the distance away from the light-emitting diodes 14a or 14b. Also, the distribution density of the rectangular-shaped longitudinal elements 34 increases along with the increase of the distance away from the light-emitting diode 14a or 14b. Note that the rectangular shape of longitudinal elements shown in FIG. 11 is merely an example and does not restrict the scope of the invention. The arc shape shown in FIG. 7 or the triangular shape shown in FIG. 9 is also suitable for the arrangement of longitudinal elements shown in FIG. 11.

Figure 12A:
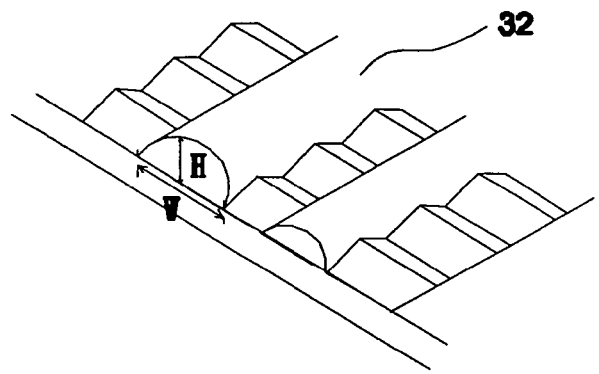
FIGS. 12A to 12C show schematic diagrams illustrating the dimension design of luminance-adjusting structures.
Figure 12B:
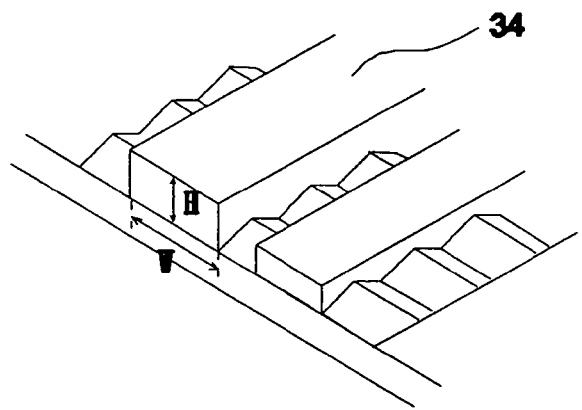
Figure 12C:
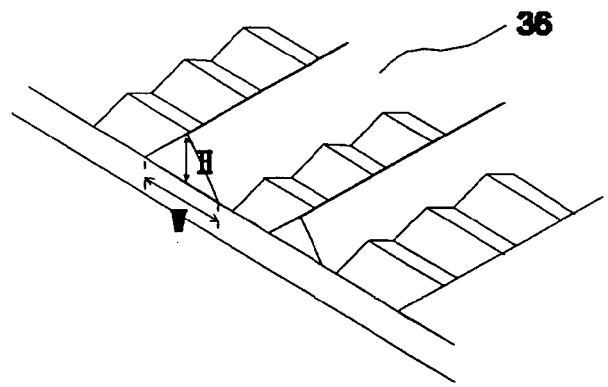

FIGS. 12A to 12C show schematic diagrams illustrating the dimension design of luminance-adjusting structures. Referring to FIG. 12A, the dimension of an arc-shaped longitudinal element 32 is defined by the thickness H and the width W. The thickness H is preferably in the range of 0.1 μm to 100 μm, and the width W is preferably in the range of 0.1 μm to 200 μm to achieve better effect of eliminating bright stripes. Also, referring to FIG. 12B, the dimension of a rectangular-shaped longitudinal element 34 is defined by the thickness H and the width W. The thickness H is preferably in the range of 0.1 μm to 100 μm, and the width W is preferably in the range of 0.1 μm to 200 μm to achieve better effect of eliminating bright stripes. Further, referring to FIG. 12C, in a triangular-shaped longitudinal element 36, the thickness H is preferably in the range of 0.1 μm to 100 μm, and the width W is preferably in the range of 0.1 μm to 200 μm to achieve better effect of eliminating bright stripes.

Figure 13:
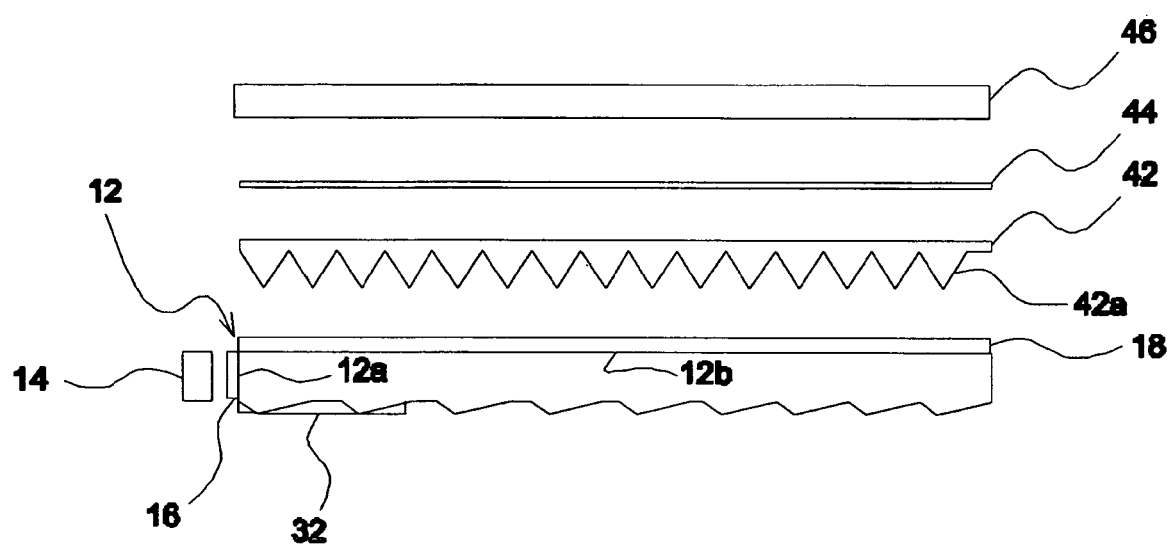
FIG. 13 shows a schematic diagram illustrating a backlight module according to an embodiment of the invention.

FIG. 13 shows a schematic diagram illustrating a backlight module 40 according to an embodiment of the invention. Referring to FIG. 13, the backlight module includes a light guide plate 12, at least one point light source (such as light-emitting diode 14), a prism sheet 42, and a diffusion sheet 44. Multiple arc-shaped longitudinal structures 16 and 18 are respectively formed on the light-receiving surface 12a and light-emitting surface 12b of the light guide plate 12. Also, luminance-adjusting structures (such as arc-shaped longitudinal elements 32) are formed on part of the bottom surface of the light guide plate 12 near the light-emitting diode 14. The prism sheet 42 is placed between the light guide plate 12 and a display panel 46, with its prismatic structures 42a facing the light-emitting surface 12b of the light guide plate 12 and aligning in a direction perpendicular to the longitudinal directions of the arc-shaped longitudinal structures 18. The outgoing light of the light guide plate 12 is directed to the normal direction of its light-emitting surface through the prism sheet 42 to improve the on-axis brightness of the backlight module 40. Further, the diffusion sheet 44 may be placed between the prism sheet 42 and the display panel 46 (shown in FIG. 13) or between the light guide plate 12 and the prism sheet 42 to further improve the luminance uniformity of the backlight module 40.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light guide plate used for receiving and spreading out the emitting light of at least one point light source, the light guide plate comprising:
   a light-receiving surface next to the point light source for receiving the emitting light of the point light source;
   a plurality of first arc-shaped longitudinal structures arranged on the light-receiving surface with their longitudinal directions being substantially parallel with each other;
   a light-emitting surface through which the light propagating in the light guide plate exits formed at an angle with the light-receiving surface;
   a plurality of second arc-shaped longitudinal structures arranged on the light-emitting surface with their longitudinal directions being substantially parallel with each other, wherein the longitudinal directions of the second arc-shaped longitudinal structures are substantially parallel with the normal of the light-receiving surface and substantially perpendicular to the longitudinal directions of the first arc-shaped longitudinal structures;
   a light-reflecting surface opposite to the light-emitting surface for guiding the light passing through the light-receiving surface to the light-emitting surface, the light-reflecting surface being shaped to form a plurality of prismatic structures; and
   a luminance-adjusting structure formed on part of the light-reflecting surface near the point light source and interlaced with the prismatic structures.

2. The light guide plate as claimed in claim 1, wherein the first and the second arc-shaped longitudinal structures are arc-shaped bumps or arc-shaped slots.

3. The light guide plate as claimed in claim 1, wherein the arc angle of each first arc-shaped longitudinal structure relative to the light-receiving surface is in the range of 39 to 140 degrees, and the arc angle of each second arc-shaped longitudinal structure relative to the light-emitting surface is in the range of 62 to 164 degrees.

4. The light guide plate as claimed in claim 1, wherein the luminance-adjusting structure comprises a plurality of longitudinal elements that have longitudinal directions substantially parallel with the longitudinal directions of the second arc-shaped longitudinal structures and have a shape of a sector of a circle, a segment of a circle, a quadrangle, or a triangle in cross-section.

5. The light guide plate as claimed in claim 4, wherein the thickness in the longitudinal direction of each longitudinal element is the same.

6. The light guide plate as claimed in claim 4, wherein the thickness in longitudinal direction of each longitudinal element decreases along with the increase of the distance away from the point light source.

7. The light guide plate as claimed in claim 4, wherein the thickness of a longitudinal element near the point light source is smaller than the thickness of a longitudinal element far from the point light source.

8. The light guide plate as claimed in claim 4, wherein the distribution density of longitudinal elements increases along with the increase of the distance away from the point light source.

9. The light guide plate as claimed in claim 4, wherein the thickness of each longitudinal element is in the range of 0.1 to 100 µm, and the width of each longitudinal element is in the range of 0.1 to 200µm.

10. The light guide plate as claimed in claim 1, wherein the prismatic structures are V-shaped grooves arranged on the light-reflecting surface, and the longitudinal directions of the V-shaped grooves are substantially perpendicular to the longitudinal directions of the second arc-shaped longitudinal structures.

11. The light guide plate as claimed in claim 10, wherein the inclination angle of each V-shaped groove is in the range of 1 to 7 degrees.

12. The light guide plate as claimed in claim 10, wherein the distribution density of the V-shape grooves on the light-reflecting surface increases along with the increase of the distance away from the light-receiving surface, and each two V-shape grooves are next to each other or discretely provided with an interval between them.

13. A backlight module, comprising:
   a plurality of point light sources;
   a light guide plate having at least a light-receiving surface, a light-emitting surface and a bottom surface and used for receiving and spreading out the emitting light of the point light sources, the light-receiving surface being next to the point light sources and the bottom surface being opposite to the light-emitting surface, wherein the light guide plate is provided with at least one first light-diffusing structure arranged on the light-receiving surface for varying the propagation paths of their emitting light and at least one second light-diffusing structure distributed on an entire surface of the light-emitting surface of the light guide plate for uniformly diffusing the light transmitted into the light guide plate; and at least one prism sheet placed between the light guide plate and a display panel, the prism sheet having prismatic structures on one surface and the prismatic structures facing the light guide plate;

wherein the point light sources are placed at intervals and next to the light guide plate, at least one third light-diffusing structure is spread on individual local regions of the bottom surface of the light guide plate, with each local region having a width no more than the distance between two adjacent point light sources and a length no more than one-third the total length of the light guide plate.

14. The backlight module as claimed in claim 13, further comprising a diffusion sheet placed between the light guide plate and the display panel.

15. The backlight module as claimed in claim 13, wherein the third light-diffusing structure comprises a plurality of longitudinal elements that are substantially parallel with each other, and the local regions on which the longitudinal elements spread adjoin the side of the light guide plate next to the point light sources.

16. The backlight module as claimed in claim 15, wherein the longitudinal elements have a shape of a sector of a circle, a segment of a circle, a quadrangle, or a triangle in cross-section.

17. The backlight module as claimed in claim 15, wherein the thicknesses of longitudinal elements are varied according to the distance away from the point light sources.

18. The backlight module as claimed in claim 15, wherein the distribution density of longitudinal elements is varied according to the distance away from the point light sources.

19. The backlight module as claimed in claim 13, wherein the second light-diffusing structure comprises first arc-shaped longitudinal structures formed on the light-receiving surface of the light guide plate and second arc-shaped longitudinal structures formed on the light-emitting surface of the light guide plate.

20. The backlight module as claimed in claim 19, wherein the longitudinal directions of the second arc-shaped longitudinal structures are substantially parallel with the normal direction of the light-receiving surface and substantially perpendicular to the longitudinal directions of the first arc-shaped longitudinal structures.

21. The backlight module as claimed in claim 19, wherein the first and the second arc-shaped longitudinal structures are arc-shaped bumps or arc-shaped slots.

22. The backlight module as claimed in claim 19, wherein the arc angle of each first arc-shaped longitudinal structure relative to the light-receiving surface is in the range of 39 to 140 degrees, and the arc angle of each second arc-shaped longitudinal structure relative to the light-emitting surface is in the range of 62 to 164 degrees.

* * * * *